United States Patent

Klippert

(10) Patent No.: US 8,390,224 B2
(45) Date of Patent: Mar. 5, 2013

(54) DRIVE DEVICE FOR AN ADJUSTING DEVICE FOR ADJUSTING A VEHICLE PART AND METHOD FOR OPERATING A DRIVE DEVICE

(75) Inventor: Uwe Klippert, Rödental (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 548 days.

(21) Appl. No.: 12/223,628

(22) PCT Filed: Feb. 2, 2007

(86) PCT No.: PCT/EP2007/001105
§ 371 (c)(1),
(2), (4) Date: Aug. 25, 2008

(87) PCT Pub. No.: WO2007/093323
PCT Pub. Date: Aug. 23, 2007

(65) Prior Publication Data
US 2009/0009112 A1   Jan. 8, 2009

(30) Foreign Application Priority Data

Feb. 14, 2006 (DE) .......................... 10 2006 007 610

(51) Int. Cl.
*H02P 6/04* (2006.01)
(52) U.S. Cl. ................ 318/400.2; 318/671; 318/400.26; 318/400.38; 318/722
(58) Field of Classification Search .................. 318/700, 318/400.01, 400.08, 400.2, 400.26, 400.38, 318/708, 722, 671
See application file for complete search history.

(56) References Cited

U.S. PATENT DOCUMENTS

| | | | | |
|---|---|---|---|---|
| 3,568,028 | A * | 3/1971 | Veillette | 318/571 |
| 4,651,068 | A * | 3/1987 | Meshkat-Razavi | 318/400.02 |
| 5,162,709 | A * | 11/1992 | Ohi | 318/400.2 |
| 5,189,354 | A * | 2/1993 | Tominaga et al. | 318/671 |
| 5,223,775 | A | 6/1993 | Mongeau | |
| 5,345,156 | A * | 9/1994 | Moreira | 318/400.04 |
| 5,376,870 | A * | 12/1994 | Ueda et al. | 318/603 |

(Continued)

FOREIGN PATENT DOCUMENTS

DE   40 38 199 A1   6/1992
DE   40 38 284 A1   6/1992

(Continued)

OTHER PUBLICATIONS

Chinese examination report dated Aug. 27, 2010 for Application No. 200780005281.8, 8 sheets.

(Continued)

*Primary Examiner* — Walter Benson
*Assistant Examiner* — Thai Dinh
(74) *Attorney, Agent, or Firm* — Christie, Parker & Hale, LLP

(57) ABSTRACT

A drive device for an adjusting device for adjusting a vehicle component of a vehicle includes an electronically commutated motor and an electronic control device which actuates the electronically commutated motor with an actuating voltage. The electronic control device can adapt the signal form of the actuating voltage on the basis of at least one operating parameter in order to optimize the power output, the acoustics, the electromagnetic irradiation and/or the heating of the drive device.

14 Claims, 2 Drawing Sheets

U.S. PATENT DOCUMENTS

| | | | |
|---|---|---|---|
| 5,469,215 A * | 11/1995 | Nashiki | 318/432 |
| 5,934,398 A * | 8/1999 | Hotta | 180/65.8 |
| 5,955,851 A | 9/1999 | Solie et al. | |
| 5,977,740 A * | 11/1999 | McCann | 318/701 |
| 5,982,067 A | 11/1999 | Sebastian et al. | |
| 5,992,556 A * | 11/1999 | Miller | 180/446 |
| 6,002,226 A * | 12/1999 | Collier-Hallman et al. | 318/400.23 |
| 6,232,730 B1 * | 5/2001 | Doyama et al. | 318/400.04 |
| 6,445,147 B1 | 9/2002 | Saitoh et al. | |
| 6,694,287 B2 * | 2/2004 | Mir et al. | 702/183 |
| 6,794,839 B1 * | 9/2004 | Maslov et al. | 318/400.2 |
| 6,838,842 B2 | 1/2005 | Feustel et al. | |
| 7,005,822 B1 * | 2/2006 | O'Gorman et al. | 318/608 |
| 7,065,437 B2 * | 6/2006 | Mir et al. | 701/41 |
| 7,071,649 B2 * | 7/2006 | Shafer et al. | 318/783 |
| 7,095,194 B2 | 8/2006 | Kro et al. | |
| 7,157,878 B2 * | 1/2007 | Collier-Hallman | 318/567 |
| 7,190,135 B2 * | 3/2007 | Collier-Hallman | 318/400.01 |
| 7,312,592 B2 * | 12/2007 | Maslov et al. | 318/432 |
| 7,423,397 B2 * | 9/2008 | Katahira | 318/432 |
| 2004/0027085 A1 | 2/2004 | Berroth et al. | |
| 2004/0066161 A1 | 4/2004 | Marx et al. | |
| 2005/0212476 A1 | 9/2005 | Satake et al. | |

FOREIGN PATENT DOCUMENTS

| | | |
|---|---|---|
| DE | 41 23 105 A1 | 1/1993 |
| DE | 41 31 984 A1 | 4/1993 |
| DE | 197 51 861 A1 | 1/1999 |
| DE | 199 44 964 A1 | 3/2001 |
| DE | 100 51 638 A1 | 7/2001 |
| DE | 100 32 896 A1 | 1/2002 |
| DE | 100 58 293 A1 | 5/2002 |
| DE | 101 06 944 A1 | 9/2002 |
| DE | 101 27 670 A1 | 9/2002 |
| DE | 103 01 275 A1 | 8/2004 |
| DE | 103 24 665 A1 | 12/2004 |
| DE | 103 35 651 A1 | 3/2005 |
| DE | 10 2005 014 1 | 10/2005 |
| DE | 10 2004 030 3 | 2/2006 |
| EP | 0 800 263 A1 | 10/1997 |
| EP | 0 955 721 A1 | 11/1999 |
| EP | 1 615 332 A1 | 1/2006 |
| JP | 04-087593 A | 3/1992 |
| JP | 04-183292 A | 6/1992 |
| JP | 07-298671 A | 11/1995 |
| JP | 2005-218299 A | 8/2005 |
| JP | 2005-219710 A | 8/2005 |
| WO | WO 02/054577 A1 | 7/2002 |

OTHER PUBLICATIONS

International Search Report, dated Sep. 20, 2007, corresponding to PCT/EP2007/001105.

English translation of International Preliminary Report on Patentability dated Sep. 18, 2008 for corresponding PCT application No. PCT/EP2007/001105.

German examination report dated Mar. 20, 2012 for application No. 10 2006 007 610.9, 10 sheets and English translation of the relevant parts, 2 sheets.

English translation of Japanese Office Action dated May 1, 2012 for Application No. JP 2008-553682, 7 sheets.

* cited by examiner

DRIVE DEVICE FOR AN ADJUSTING DEVICE FOR ADJUSTING A VEHICLE PART AND METHOD FOR OPERATING A DRIVE DEVICE

CROSS-REFERENCE TO A RELATED APPLICATION

This application is a National Phase Patent Application of International Patent Application Number PCT/EP2007/001105, filed on Feb. 2, 2007, which claims priority of German Patent Application Number 10 2006 007 610.9, filed on Feb. 14, 2006.

BACKGROUND

The invention relates to a drive device for an adjusting device for adjusting a vehicle component of a vehicle and to a method for operating a drive device.

Such a drive device is known from DE 197 51 861 A1 which discloses a drive device having an electronically commutated electric motor and an electronic control device in which the electronically commutated motor is provided with a sensor for sensing the rotational speed and/or the position of a rotor which interacts with a microcomputer of the control device in order to evaluate the sensor signals transmitted by the sensor. In order to drive the electronically commutated motor, an actuating voltage is applied to the electronically commutated motor via the electronic control device, the frequency and/or pulse width of which actuating voltage can be varied in order to adjust the rotational speed of the electronically commutated motor. The drive device also has a semiconductor output stage which is connected between the electronic control device and the electronically commutated motor in order to amplify the signal of the actuating voltage.

Electronically commutated motors have, compared to mechanically commutated motors, the advantage that the wearing parts which are necessary for mechanical commutation are dispensed with, and in particular no brushes are necessary for commutation, said brushes being subject to an increased degree to erosion and also giving rise to electromagnetic interference signals due to brush sparking, and therefore adversely affecting the EMC (electromagnetic compatibility) behavior.

An electronically commutated motor has a rotor and a stator which interact in order to drive the electronically commutated motor electrically. For this purpose, electrical windings are arranged in the stator, a current flowing through said windings and as a result generating an electromagnetic field which interacts with the rotor in such a way that the rotor is caused to rotate. In order to cause a current to flow in the electrical windings of the stator, an actuating voltage which can change over time is applied to the electronically commutated motor via an electronic control device.

In order to actuate the electronically commutated motor, an actuating voltage with a square-wave signal form is conventionally selected since as a result a maximum power output of the drive device which has a semiconductor output stage can be achieved and the square-wave signal form can be brought about by simply switching over the actuating voltage. However, such a square-wave signal form has the disadvantage that the acoustics of the drive device and the electromagnetic irradiation of the drive device can be increased. If, on the other hand, a sinusoidal signal is selected for the actuating voltage, the acoustics of the drive device is improved but the power output of the drive device is considerably worsened.

SUMMARY

The object of the present invention is to make available a drive device and a method for operating a drive device with which the operating behavior of the drive device is improved in terms of the acoustics, the electromagnetic irradiation, the heating and the power output of the drive device.

According to an exemplary embodiment of the invention there is provision here that in a drive device for an adjusting device for adjusting a vehicle component of a vehicle having an electronically commutated motor and an electronic control device which actuates the electronically commutated motor by means of an actuating voltage, the electronic control device has means, by means of which the signal form of the actuating voltage can be adapted on the basis of at least one operating parameter in order to optimize the power output, the acoustics, the electromagnetic irradiation and/or the heating of the drive device.

The invention is based on the realization that the operating behavior of a drive device is determined by the signal form of the actuating voltage which actuates the electronically commutated motor of the drive device. Different signal forms may be optimum here for operating behaviors which are optimized in terms of different criteria. In particular there are signal forms with which the acoustics, that is to say essentially the volume, of the drive device during operation can be optimized, the power output, corresponding to the efficiency of the drive device with which electrical energy is converted into mechanical work, can be optimized, the electromagnetic irradiation which is essentially determined by the electromagnetic interference signals irradiated by the electronically commutated motor can be optimized, and/or the heating of the drive device, determined essentially by the heating of semiconductor components which actuate the electronically commutated motor, and the heating of the motor itself, can be optimized.

The basic idea of the invention is to adapt the signal form of the actuating voltage here in each case in such a way that the operating behavior of the drive device is optimized as a function of operating parameters in terms of optimization criteria, in particular the acoustics, the power output, the electromagnetic irradiation and/or the heating of the drive device. The operating parameters therefore function as input variables which describe the state of the drive device, of the vehicle and/or of the surroundings and on the basis of which the signal form of the actuating voltage is selected in order to optimize the power output, the acoustics, the electromagnetic irradiation and/or the heating of the drive device. The term signal form is to be understood here as meaning the basic form of the signal of the actuating voltage which may have, for example, a sinusoidal form, a square-wave form, a triangular form or any other desired form.

Operating parameters which serve as input variables for determining a signal form to be used can be in this context, in particular:

the current taken up by the electronically commutated motor, the power taken up by the electronically commutated motor, the number of activations of the drive devices, the activation behavior of the drive device, for example difficulty of movement or ease of movement of the adjusting device, the adjustment speed of the drive device, that is to say the speed with which the vehicle component to be adjusted is moved by the drive device, the position of the vehicle component to be adjusted by the drive device, the external temperature, that is to say the temperature of the surroundings, the electromagnetic irradiation of the drive device, in particular the irradiation of electromagnetic interference signals by the electronically commutated motor, which essentially determines the EMC behavior of the drive device, the operating temperature of the drive device, in particular the temperature of semiconductor components of the electronic control device and the temperature of the electronically commutated motor, the volume of the drive device, in particular the noise level generated by the electronically commutated motor, the voltage of an on-board electric supply system of the vehicle, for example the available battery voltage of the vehicle, the movement state of the vehicle, for example the information as to whether the vehicle is stationary or traveling, and/or the velocity of the vehicle.

The optimum signal form for operating the drive device is then selected on the basis of the operating parameters. For example, the signal form of the actuating voltage when the volume of the drive device is increased can be adapted during operation in such a way that the volume is reduced, and therefore the acoustics of the drive device is improved. In another case, when the operating temperature of the semi-conductor components of the drive device is increased, the signal form of the actuating voltage can be selected in such a way that the power output of the drive device is improved, the temperature of the semi-conductor components is therefore lowered and the heating of the drive device is reduced. In yet another case, it is possible to select an optimum signal form for minimum irradiation of electromagnetic interference signals. In yet another case, when there is difficulty of movement of the drive device and/or of the vehicle component to be adjusted, the power output is optimized, and the torque which is made available by the drive device is therefore maximized.

The electronic control device exemplary interacts with at least one sensor which serves to sense one or more of the operating parameters. For example, it is possible to provide a sensor for sensing the rotational speed of the electronically commutated motor. Further sensors may serve, for example, to determine the position of the vehicle component to be adjusted by the drive device, to measure the external temperature, to measure the electromagnetic irradiation of the electronically commutated motor and/or to measure the operating temperature of the drive device, in particular of the semiconductor components and of the motor which are used in the drive device.

According to an exemplary embodiment of the invention, the signal form of the actuating voltage for actuating the electronically commutated motor is adapted as a function of operating parameters. The signal form may be capable of being freely synthesized here in order to optimize the power output, the acoustics, the electromagnetic irradiation and/or the heating of the drive device. For example, the signal form may be a square-wave form or sinusoidal but it may also have any other desired form. The control device then determines the signal form in each case in such a way that the operating behavior is optimized in terms of the power output, the acoustics, the electromagnetic irradiation and/or the heating of the drive device. The signal form may in this case also have in particular such a form that the signal form is optimum in terms of a combination of optimization criteria. The signal form then constitutes a compromise with which the operating behavior of the drive device is optimized in terms of the combination of the optimization criteria, that is to say for example in terms of the combination of power output and acoustics. As a rule, a square-wave signal form brings about optimization of the power output, while a sinusoidal signal form permits the volume of the drive device during operation to be reduced. Any other desired signal forms with which different operating states can be respectively optimized or an optimum overall operating behavior of the drive device can be achieved are conceivable.

The electronic control device of the drive device exemplary has, for determining the optimum signal form, a microcomputer which selects the signal form of the actuating voltage on the basis of the operating parameters from a number of predefined signal forms which are stored in a memory medium of the electronic control unit. In the memory medium, different signal forms, which are respectively assigned to an operating state, are stored in this context. For example, signal forms by means of which the power output can be maximized, the acoustics optimized, the electromagnetic irradiation minimized and/or the heating of the drive device limited can be stored in the memory medium. It is then possible, for example, for a signal form which brings about an optimum power output to be stored in the memory medium. Yet another signal form may be optimum for the quietest possible operating behavior of the drive device, that is to say improved acoustics with reduced volume. In the memory medium there may be a third signal form which reduces the electromagnetic irradiation, and there may be further signal forms by means of which the operating behavior is optimized in terms of other criteria. The different signal forms may be determined in advance here and be stored in the memory medium so that they can then be selected by the microcomputer of the electronic control device during operation of the drive device.

The signal form is exemplary varied and adjusted during operation of the drive device, that is to say is changed as a function of the operating behavior of the drive device, in order to adapt the operating behavior almost simultaneously taking into account the operating parameters and to bring about an operating behavior which is optimized in terms of the power output, the acoustics, the electromagnetic irradiation and/or the heating of the drive device.

According to an exemplary embodiment of the invention, there is provision here that in a method for operating a drive device for an adjusting device of a vehicle having an electronically commutated motor and an electronic control device which actuates the electronically commutated motor by means of an actuating voltage, the signal form of the actuating voltage is adapted on the basis of at least one operating parameter in order to optimize the power output, the acoustics, the electromagnetic irradiation and/or the heating of the drive device.

The method according to the exemplary embodiment of the invention therefore permits variable adaptation of the actuating voltage on the basis of operating parameters in order to optimize the operating behavior of the drive device.

In this context the signal form of the actuating voltage is exemplary selected from a number of predefined signal forms on the basis of the operating parameters, in which case the signal forms can be stored in advance in a memory medium of the electronic control device of the drive device and selected by means of a microcomputer of the electronic control device.

During a normal operating mode of the drive device during which only a small number of activations of the drive device takes place, the signal form is then advantageously selected in such a way that the acoustics, that is to say in particular the volume of the drive device during operation, and the electromagnetic irradiation of the drive device are optimized. In the normal operating mode during which it is not expected that there will be overheating of the drive device, in particular of the semiconductor components and of the motor of the drive device, a quiet operating behavior, which is pleasant for a vehicle occupant and is accompanied by low electromagnetic interference of other components, is therefore ensured.

In contrast to the normal operating mode, in a load mode, that is to say when there is frequent activation or when there is difficulty of movement of the drive device, the signal form can be selected in such a way that the operating temperature of the drive device is prevented, that is to say in particular the temperature of the semiconductor components of the drive device and the temperature of the electronically commutated motor, from being limited. In the load mode, when there is a risk of overheating, the signal form can then be adapted in such a way that the power output is optimized, and lower power is then required to operate the drive device, and overheating is therefore counteracted.

Under other different conditions, for example if only a low voltage is made available by an on-board electric supply system of the vehicle, the power output of the drive device can be optimized and the energy consumption of the drive device therefore reduced. Other circumstances under which it is advantageous to optimize the power output are operating states of the drive device in which there is difficulty of movement of the adjusting device, for example due to the loading or the position of the vehicle component to be adjusted. An increased power output is equivalent here to an increase in the force made available by the drive device for adjusting the vehicle component of the adjusting device.

For the purpose of optimization of the acoustics of the drive device it is possible, in particular, to use an approximately sinusoidal signal form for the actuating voltage by means of which a quiet running behavior of the electronically commutated motor is achieved. Furthermore, the approximately sinusoidal signal form can be adapted in order to minimize the irradiation of electromagnetic interference signals.

For the purpose of optimization of the power output it is possible, in particular, to select an approximately square-wave signal form.

In one exemplary variant of the method, the signal form of the actuating voltage is determined during operation of the drive device on the basis of the operating parameters in such a way that the power output, the acoustics, the electromagnetic irradiation and/or the heating of the drive device are optimized. The signal form which is determined is then stored in a memory medium and can be called later, in a similar operating state, from the memory medium and used as a signal form for the actuating voltage. The drive device is therefore capable of learning new signal forms during operation of the drive device and of using said signal forms to react to an operating state which is described by operating parameters. For example, in this context the associated combination of the operating parameters for an operating state in which overheating of the drive device is to be expected can be stored in order, in the event of future occurrence of this combination of operating parameters, to be able to react without delay to the threat of overheating by calling the stored signal form. In this way it is possible to minimize the expenditure on determining the signal forms by virtue of the fact that signal forms are determined and stored only once so that they are available for future operation. Repeated optimization of the signal form is therefore not necessary.

It is possible here for the signal form to be optimized on the basis of the operating parameters during operation by means of an iterative optimization algorithm in order to achieve an optimum signal form for an operating state which is optimized in terms of the power output, the acoustics, the electromagnetic irradiation and/or the heating. The signal form which is determined in this way as being the optimum one for this operating state is then stored and is therefore available for calling during operation.

In one exemplary variant, during operation of the drive device, movement processes of a vehicle component to be adjusted by the drive device are learnt and are stored on the basis of operating parameters. For example, it is possible, by means of the operating parameters sensed using sensors, to infer the position and the adjustment movement of the vehicle component and therefore sense possible difficulties of movement of the vehicle component during the adjustment movement. On the basis of the operating parameters, for example the adjustment position, the adjustment movement and the signal form to be used can then be saved and stored so that when similar operating parameters are sensed during subsequent adjustment processes the associated optimum signal form can be called immediately.

BRIEF DESCRIPTION OF THE DRAWINGS

The basic idea of the invention will be explained in more detail on the basis of the exemplary embodiments illustrated in the following figures, of which.

DETAILED DESCRIPTION

Figure 1:
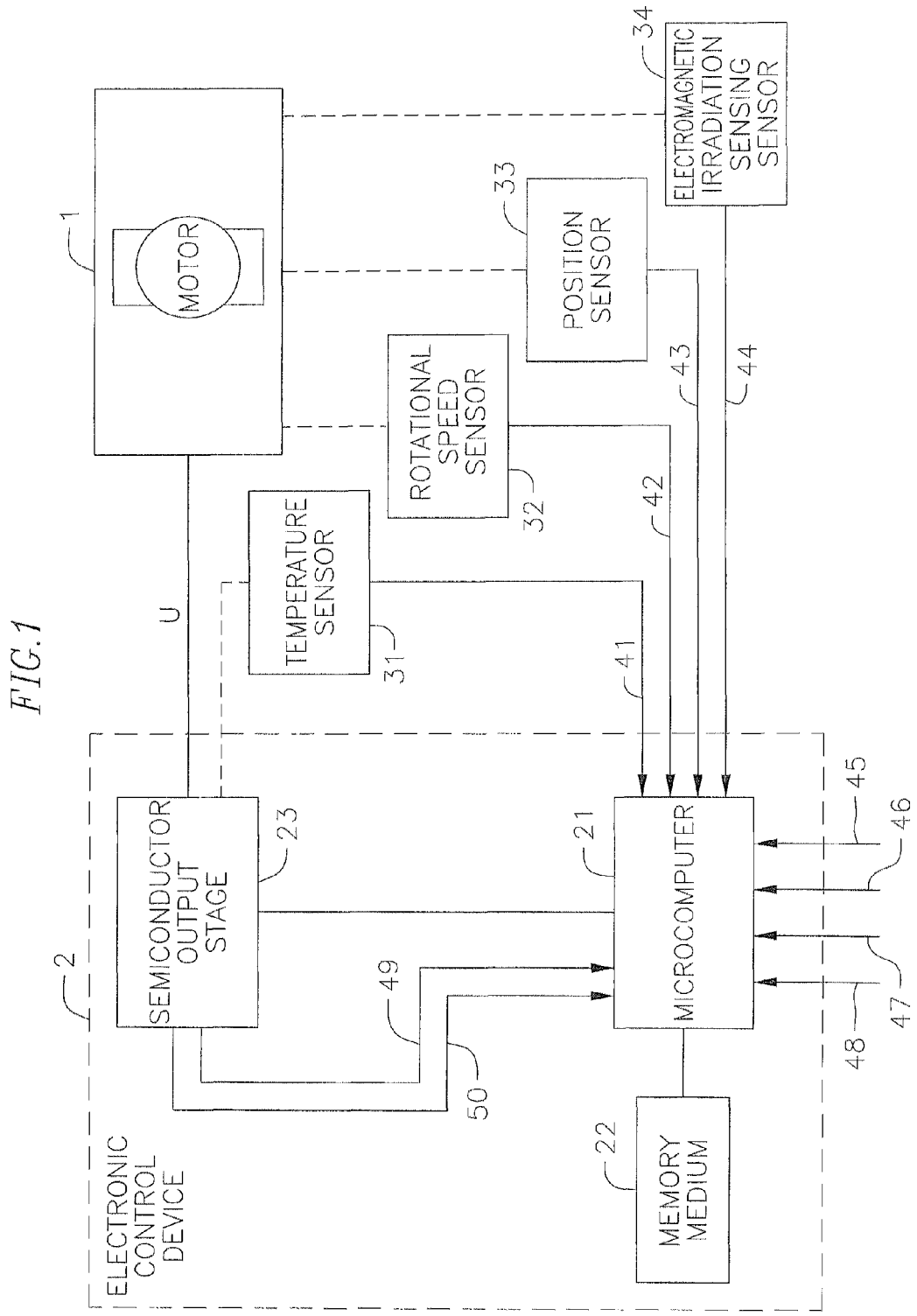
FIG. 1 is a schematic illustration of a drive device having an electronically commutated motor and an electronic control device.

FIG. 1 shows a schematic illustration of a drive device for an adjusting device which can advantageously be used to adjust a vehicle component of a vehicle. The drive device has an electronically commutated motor 1 and an electronic control device 2 which is formed by a microcomputer 21, a memory medium 22 and a semiconductor output stage 23. The electronic control device 2 serves to actuate the electronically commutated motor 1, wherein the microcomputer 21 of the electronic control device 2 generates an actuating voltage U which is amplified by the semiconductor output stage 23 and fed to the electronically commutated motor 1. The electronically commutated motor 1 acts on a movable vehicle component, for example a window pane of a vehicle door or a sunroof, in order to drive an adjustment movement. In this context, the electronically commutated motor 1 is actuated by the electronic control device 2 by means of the actuating voltage U, and is driven by virtue of the fact that the actuating voltage generates a flow of current in electrical windings on a stator of the electronically commutated motor 1, and the electrical turns therefore bring about an electromagnetic field which interacts with a rotor of the electronically commutated motor 1 and causes the rotor to rotate.

The operating behavior of the electronically commutated motor 1 is essentially dependent on the actuating voltage U and its signal form. A square-wave signal form is conventionally selected for the actuating voltage U, which signal form therefore corresponds to a switching function and is correspondingly easy to implement. Such a square-wave signal form is advantageous in terms of the power output of the semi-conductor output stage 23 and its semiconductor components which amplify the signal made available by the microcomputer 21 and make available the actuating voltage U to the electronically commutated motor 1. However, such a square-wave signal form is disadvantageous in terms of the acoustics of the electronically commutated motor 1 during operation. In order to bring about an operating behavior of the drive device which is as quiet as possible and is optimized in terms of the acoustics, the actuating voltage U which is made available to the electronically commutated motor 1 will ideally be sinusoidal. A sinusoidal actuating voltage U is however in turn disadvantageous for the power output of the semiconductor output stage 23 and therefore brings about increased heating of the semiconductor output stage 23 when the drive device is operating.

The basic idea of the present invention is to select the signal form of the actuating voltage on the basis of operating parameters and to respectively adapt them, for the purpose of optimizing the power output, the acoustics, the electro-magnetic irradiation and/or the heating of the drive device, in such a way that an optimized operating behavior is brought about. For this purpose, the drive device according to FIG. 1 has a memory medium 22 and a number of sensors 31-34 which each interact with the microcomputer 21 of the electronic control device 2. The measurement signals sensed by the sensors 31-34 represent operating parameters 41-44 which are made available to the microcomputer 21 and on the basis of which the microcomputer 21 selects the signal form for the actuating voltage U which is the optimum one for the respective combination of operating parameters 41-44. The sensors may be in the form here of, for example,

- a temperature sensor 31 for sensing the temperature of the semiconductor output stage 23 and its semiconductor components,
- a rotational speed sensor 32 for sensing the rotational speed of the electronically commutated motor 1,
- a position sensor 33 for sensing the position of the vehicle component which is driven by the electronically commutated motor 1, and
- a sensor 34 for sensing the electromagnetic irradiation, that is to say the irradiated interference signals of the electronically commutated motor 1.

Further operating parameters 45-48 may be made available to the microcomputer 21, and these operating parameters 45-48 may include, for example,

- the temperature of the surroundings, measured by means of an external sensor,
- the volume of the drive device, measured by means of a microphone,
- the voltage of an on-board electronic supply system of the vehicle,
- the movement state of the vehicle and/or
- the velocity of the vehicle.

Furthermore, the microcomputer 21 may acquire, as operating parameters 49, 50, the current taken up by the electronically commutated motor 1, the power taken up by the electronically commutated motor 1 and the number of activations of the drive device.

In order to determine the actuating voltage U and its signal form, the microcomputer 21 acquires the operating parameters 41-50 and selects an optimum signal form for the actuating voltage U on the basis of the operating parameters 41-50. The drive device may include a large number of operating parameters 41-50 here for the determination of the optimum signal form. However, it is also conceivable for the signal form to be selected only on the basis of an individual operating parameter or of a small number of operating parameters. It is conceivable, for example, that only the temperature of the semiconductor output stage 23 is sensed and the signal form of the actuating voltage U is adapted as a function of the heating of the semiconductor output stage 23 in such a way that excessive heating is counteracted.

The signal form of the actuating voltage can be determined here in different ways. On the one hand, a number of signal forms which are determined in advance can be stored in the memory medium 22, from which signal forms the microcomputer 21 respectively selects an optimized signal form for a specific combination of operating parameters 41-50. For example, the microcomputer 21 can detect the heating of the semiconductor output stage 23 during operation of the drive device on the basis of the temperature of the semiconductor output stage 23 and of its semiconductor components which is sensed by the sensor 31. On the basis of this information, the microcomputer 21 then selects, from the number of different signal forms stored in the memory medium 22, a signal form by means of which an increased power output can be brought about in the semi-conductor output stage 23, with the result that the power made available to operate the electronically commutated motor 1 can be reduced. In this way it is then possible to reduce the power loss which brings about the heating of the semiconductor output stage 23, and therefore to counteract overheating of the semiconductor output stage 23 and therefore of the drive device.

In another operating situation, the microcomputer 21 can, for example, sense that the volume of the electronically commutated motor 1 has increased and at the same time a greater number of electromagnetic interference signals are being irradiated by the electronically commutated motor 1. In order to counteract this, the microcomputer 21 then selects, from the number of signal forms stored in the memory medium 22, the signal form by means of which both the volume of the electronically commutated motor 1 and the electromagnetic irradiation can be optimized. The other operating parameters, for example the ambient temperature, the movement state of the vehicle and the velocity, can be taken into account in this case and can be included in the selection of the optimum signal form.

It is also conceivable for the optimum signal form to be determined during operation by means of an optimization algorithm. In this case, the microcomputer 21 senses operating parameters 41-50 which are to be optimized, for example the temperature of the semi-conductor output stage 23 and/or the volume of the drive device, and it adapts the signal form of the actuating voltage U iteratively until the operating parameters 41-50, in this case the temperature of the semiconductor output stage 23 and the volume of the drive device, have reached acceptable values. In this way it is possible for signal forms to be learnt by the microcomputer 21. The signal forms which are determined by means of the optimization algorithm are subsequently stored in the memory medium 22 and are therefore available in future. If similar combinations of operating parameters 41-50 occur during later operation of the drive device, the stored signal form is called on the basis of the respective combination of the operating parameters 41-50 and is used to optimize the operating behavior of the drive device. Storage of the determined signal forms in the memory medium 22 then obviates the need for renewed determination of the optimum signal form during later operation. This permits a considerable reduction in the computing power and in the expenditure during operation and ensures that when a combination of operating parameters 41-50 is sensed the optimum signal form can be made available without delay and almost simultaneously.

It is also conceivable that the electronic control device learns movement processes during repeated operation and stores them on the basis of operating parameters 41-50. For example, the adjustment movement of the vehicle component can be inferred by means of the operating parameters 42, 43 which are sensed using the sensors 32, 33 and which specify the rotational speed of the electronically commutated motor (which is correlated to the adjustment speed of the vehicle component to be adjusted) and the position of the vehicle component. In this way possible difficulties of movement of the vehicle component during the adjustment movement can be sensed and stored on the basis of the operating parameters, for example the adjustment position. If, in the case of a renewed adjustment process, the vehicle component is in an adjustment position in which difficulty of movement had been sensed in a previous adjustment process, the signal form of the actuating voltage U can be adapted automatically as a function of the adjustment position in such a way that the torque which is made available by the drive device is maximized by optimizing the power output of the drive device, and the difficulty of movement is therefore counteracted by the provision of an increased adjusting force. In this way it is possible to react automatically and in good time to difficulties in movement which possibly occur during an adjustment process of a vehicle component. In principle it is also conceivable to embody the electronic control device 2 without a memory medium 22, and said electronic control device 2 then respectively determines an optimum signal form iteratively on the basis of the operating parameters 41-50 without making use of previously stored signal forms.

Figure 2:
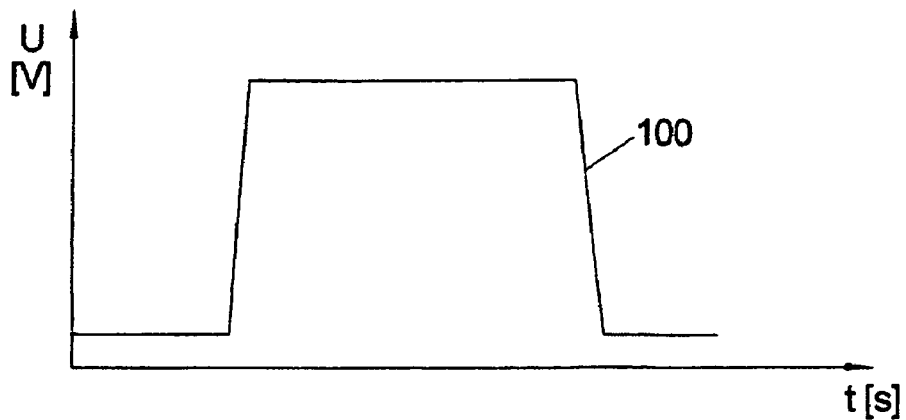
FIG. 2 is a graphic illustration of a square-wave signal form of the actuating voltage.
Figure 3:
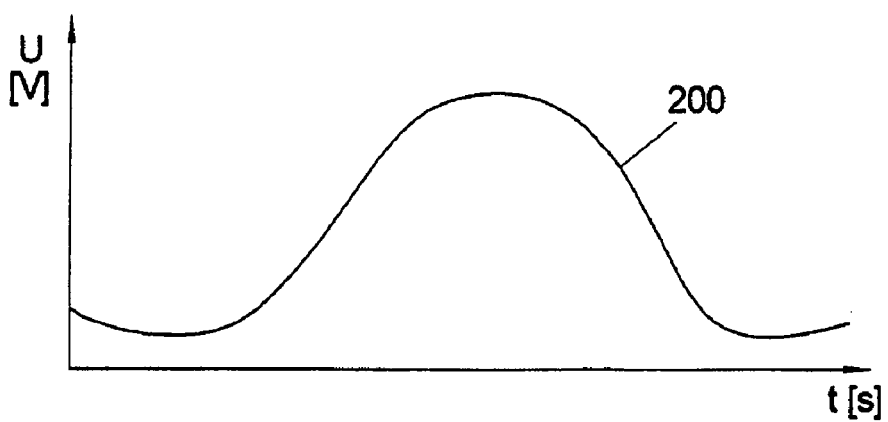
FIG. 3 is a graphic illustration of an approximately sinusoidal signal form of the actuating voltage.
Figure 4:
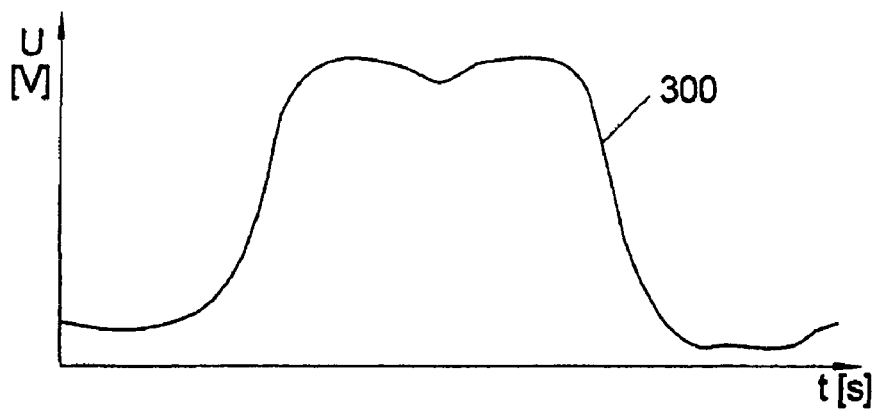
FIG. 4 is a graphic illustration of a signal form which is optimized for an operating state.

FIGS. 2 to 4 show different signal forms of the actuating voltage U plotted over time t, which signal forms may be respectively the optimum ones for bringing about specific operating behaviors and can be used to optimize the power output, the acoustics, the electro-magnetic irradiation and/or the heating of the drive device. FIGS. 2 to 4 show here in detail a square-wave signal form 100 of the actuating voltage U (FIG. 2), an approximately sinusoidal signal form 200 (FIG. 3) and an optimized signal form 300 which is neither square wave nor sinusoidal (FIG. 4).

The square-wave signal form 100 according to FIG. 2 is generally the optimum one here for operation with an increased power output and it can be used to bring about reduced power loss in the semiconductor output stage 23 for the same drive power, or in order to make available an increased adjusting force for the adjusting device when the power is increased.

The sinusoidal signal form 200 according to FIG. 3 is generally the optimum one for a quiet operating behavior of the electronically commutated motor 1 since it models, in a virtually ideal way, the sinusoidal electromagnetic alternating field which is necessary to operate the electronically commutated motor 1, and therefore generates an alternating field which is optimum for quiet driving of the electronically commutated motor 1. The sinusoidal signal form according to FIG. 3 leads, however, to a worsened power output of the semiconductor output stage 23 and therefore to an increased power loss of the semiconductor output stage 23 which is converted into heat and as a result leads to heating of the semi-conductor output stage 23.

The signal form 300 according to FIG. 4 is neither sinusoidal nor square wave and represents, for example, a signal form in which the electromagnetic irradiation, that is to say the generation of electromagnetic interference signals by the electronically commutated motor 1, is reduced or an optimized overall operating behavior, that is to say an operating behavior which is simultaneously optimized in terms of a plurality of optimization criteria (for example the power output and the electromagnetic irradiation), is obtained.

Use of the invention is not restricted to the exemplary embodiments described above. For example, operating parameters of quite different types can be used and included in the determination of the signal form. Furthermore, the optimization of the signal form can result in any desired signal forms of quite different types which constitute signal forms which are optimized in terms of one or more operating parameters.

The invention claimed is:

1. A drive device for an adjusting device for adjusting a vehicle component of a vehicle, the drive device comprising an electronically commutated motor and an electronic control device which actuates the electronically commutated motor with an actuating voltage, wherein the electronic control device is configured to adapt a signal form of the actuating voltage on the basis of at least one operating parameter in order to optimize at least one of power output, acoustics, electromagnetic irradiation and heating of the drive device, the electronic control device comprising a microcomputer which selects the signal form of the actuating voltage on the basis of the at least one operating parameter from a number of predefined signal forms which are stored in a memory medium of the electronic control unit, wherein the signal form is a basic form of a signal of the actuating voltage and different signal forms, which are respectively assigned to an operating state of the drive device, are stored in the memory medium, wherein the electronic control device is configured to adapt the signal form of the actuating voltage selectively to at least one of an approximately sinusoidal signal form or to an approximately square-wave signal form each stored in the memory medium, so that the signal form of the actuating voltage may be selected on the basis of the at least one operating parameter from at least one approximately sinusoidal and at least one approximately square-wave signal form, respectively, stored in the memory medium, and
 wherein the microcomputer determines a signal form of the actuating voltage during an operation of the drive device on the basis of the at least one operating parameter such that at least one of the power output, the acoustics, the electromagnetic irradiation and the heating of the drive device is optimized, and stores the determined signal form in the memory medium so that the determined signal form may be later selected for adapting the signal form of the actuating voltage.

2. The drive device of claim 1, wherein the at least one operating parameter is formed by at least one of a current taken up by the electronically commutated motor, power taken up by the electronically commutated motor, number of activations of the drive device, activation behavior of the drive device, adjustment speed of the drive device, position of the vehicle component to be adjusted by the drive device, external temperature, electromagnetic irradiation of the drive device, operating temperature of the drive device, volume of the drive device, voltage of an on-board electric supply system of the vehicle, movement state of the vehicle and velocity of the vehicle.

3. The drive device of claim 1, wherein the electronic control device is configured to interact with at least one sensor for sensing the at least one operating parameter.

4. The drive device of claim 1, wherein the signal form of the actuating voltage is configured to be freely synthesized in order to optimize at least one of the power output, the acoustics, the electromagnetic irradiation and the heating of the drive device.

5. The drive device of claim 1, wherein the electronic control device is configured to vary and adjust the signal form of the actuating voltage on the basis of the at least one operating parameter in order to optimize the power output, the acoustics, the electromagnetic irradiation and the heating of the drive device during operation of the drive device.

6. The method of claim 1, wherein the signal form of the actuating voltage is determined on the basis of the at least one operating parameter with iterative optimization.

7. The method of claim 6, wherein the signal form of the actuating voltage determined during an operation of the drive device is optimized on the basis of the at least one operating parameter by means of an iterative optimization in order to achieve an optimum signal form for an operating state which is optimized in terms of at least one of the power output, the acoustics, the electromagnetic irradiation and the heating of the drive device.

8. A method for operating a drive device for an adjusting device of a vehicle, the drive device having an electronically commutated motor and an electronic control device which actuates the electronically commutated motor with an actuating voltage, the method comprising adapting a signal form of the actuating voltage on the basis of at least one operating parameter in order to optimize at least one of power output, acoustics, electromagnetic irradiation and heating of the drive device, wherein the signal form is a basic form of a signal of the actuating voltage and wherein a number of predefined different signal forms, which are respectively assigned to an operating state of the drive device, are stored in a memory medium, wherein the signal form of the actuating voltage is selectively adapted to at least one of an approximately sinusoidal signal form or an approximately square-wave signal form each stored in the memory medium, so that the signal form of the actuating voltage may be selected on the basis of the at least one operating parameter from at least one approximately sinusoidal and at least one approximately square-wave signal form, respectively, stored in the memory medium, the method further comprising determining a signal form of the actuating voltage during an operation of the drive device on the basis of the at least one operating parameter such that at least one of the power output, the acoustics, the electromagnetic irradiation and the heating of the drive device is optimized, and storing the determined signal form in the memory medium so that the determined signal form may be later selected for adapting the signal form of the actuating voltage.

9. The method of claim 8, wherein, in a normal operating mode at a small number of activations of the drive device, the signal form is selected in such a way that the acoustics and the electromagnetic irradiation of the drive device are optimized.

10. The method of claim 8, wherein, in a load mode when there is frequent activation of the drive device, the signal form is selected in such a way that an operating temperature of the drive device is limited.

11. The method of claim 8, wherein, when a voltage of an on-board electric supply system of the vehicle is low, the power output of the drive device is optimized.

12. The method of claim 8, wherein for the purpose of optimization of the acoustics, an approximately sinusoidal signal form is used for the actuating voltage.

13. The method of claim 8, wherein for the purpose of optimization of the power output of the drive device, an approximately square-wave signal form is used for the actuating voltage.

14. The method of claim 8, further comprising learning and storing movement processes of a vehicle component to be adjusted by the drive device on the basis of at least one operating parameter.

* * * * *